United States Patent [19]

Rasmussen et al.

[11] Patent Number: 4,996,243

[45] Date of Patent: Feb. 26, 1991

[54] CURABLE ACRYLAMIDO OLIGOMER COMPOSITIONS WITH INITIATOR, AND CURED PRODUCTS

[75] Inventors: Jerald K. Rasmussen, Stillwater; Steven M. Heilmann, Afton, both of Minn.; Frederick J. Palensky, Tokyo, Japan

[73] Assignee: Minnesota Mining and Manufacturing Company, St. Paul, Minn.

[21] Appl. No.: 465,041

[22] Filed: Jan. 16, 1990

Related U.S. Application Data

[63] Continuation of Ser. No. 233,218, Aug. 17, 1988, Pat. No. 4,914,223, which is a continuation-in-part of Ser. No. 316,234, Oct. 29, 1981, Pat. No. 4,777,276.

[51] Int. Cl.$^5$ .................... C08F 2/50; C08F 20/58; C08F 20/60

[52] U.S. Cl. ...................... 522/99; 522/104; 522/107; 522/149; 522/172; 522/174; 525/10; 525/279; 525/404; 525/445; 525/479; 526/279; 526/302; 526/304; 526/306; 528/26

[58] Field of Search ................ 522/99, 104, 107, 149, 522/172, 174; 525/10, 279, 404, 445, 479; 526/279, 302, 304, 306; 328/26

[56] References Cited

U.S. PATENT DOCUMENTS

| | | | |
|---|---|---|---|
| 2,681,354 | 6/1954 | Kelley | 260/404.5 |
| 2,749,331 | 6/1956 | Breslow | 260/89.7 |
| 3,008,851 | 11/1961 | Zeitschel | 117/138.8 |
| 3,010,925 | 11/1961 | Lynn | 260/23 |
| 3,297,745 | 1/1967 | Fekete et al. | 260/471 |
| 3,694,506 | 9/1972 | Franco et al. | 260/561 N |
| 3,700,643 | 10/1972 | Smith et al. | 260/77.5 |
| 4,065,627 | 12/1977 | Harrison | 560/26 |
| 4,078,015 | 3/1978 | Leitheiser et al. | 260/849 R |
| 4,100,047 | 7/1978 | McCarty | 204/159.23 |
| 4,101,477 | 7/1978 | Lawson | 260/22 |
| 4,110,310 | 8/1978 | Schulze | 528/119 |
| 4,131,602 | 12/1978 | Hodakowski et al. | 528/49 |
| 4,134,916 | 1/1979 | Moss et al. | 260/561 N |
| 4,136,250 | 1/1979 | Mueller et al. | 528/29 |
| 4,159,383 | 6/1979 | Culbertson | 560/43 |
| 4,777,276 | 10/1988 | Rasmussen | 558/442 |

FOREIGN PATENT DOCUMENTS

21266 6/1963 Japan.
1130438 10/1968 United Kingdom.

OTHER PUBLICATIONS

Hackh's Chemical Dictionary, 4th Ed., 1969, pp. 16, 35 and 534.
Ulrich, "Introduction to Industrial Polymers," (1982) pp. 75 and 99.

*Primary Examiner*—Marion C. McCamish
*Assistant Examiner*—Arthur H. Koeckert
*Attorney, Agent, or Firm*—Donald M. Sell; Walter N. Kirn; Lorraine R. Sherman

[57] ABSTRACT

A composition of matter comprising an acrylamido-acyl or methacrylamido-acyl oligomer derived from at least one nucleophilic oligomer having at least one amino-, hydroxyl-, or thiol-substituted polyoxyalkylene, polyalkyleneimine, polyester, polyolefin, polyacrylate, or polysiloxane oligomer, said nucleophilic oliogmer having a molecular weight in the range of 200 to 20,000 is disclosed. Also disclosed are free radially polymerizable monomer-containing compositions containing said oligomers as well as acrylamido- and methacrylamido-acylated polymers which are the thermal or photocured products of said oligomers. In addition, a process is disclosed for providing said acrylamido- and methacrylamido-acylated oligomers which are useful, for example, in coatings, films, printing inks, adhesives, and saturants.

11 Claims, No Drawings

CURABLE ACRYLAMIDO OLIGOMER COMPOSITIONS WITH INITIATOR, AND CURED PRODUCTS

This is a continuation of application Ser. No. 07/233,218, filed Aug. 17, 1988, now U. S. Pat. No. 4,914,223, which is a continuation-in-part application of U.S. patent application Ser. No. 06/316,234, filed Oct. 29, 1981, now U.S. Pat. No. 4,777,276.

FIELD OF THE INVENTION

This invention relates to novel acrylamido- and methacrylamido-acylated oligomers and free radically polymerizable monomer-containing compositions containing said oligomers. In another aspect, it relates to acrylamido- and methacrylamido-acylated polymers which are the thermal or photocured products of said oligomers. In a further aspect, a process is disclosed for providing said acrylamido- and methacrylamido-acylated oligomers which are useful, for example, in coatings, films, printing inks, adhesives, and saturants.

BACKGROUND ART

It is known in the art to prepare acrylic-functional resin compositions by direct esterification of alcohols or polyols with (meth)acrylic acid or its derivatives, as disclosed in U.S. Pat. No(s). 3,010,925 and 4,101,477. Inherent difficulties in such processes include the need for solvents and for relatively high reaction temperatures, the latter requiring that suitable precautions be taken to prevent premature polymerization. In order to overcome these and other difficulties, U.S. Pat. No(s). 3,297,745, 3,700,643, 4,131,602, and others have taught that 100% solids, copolymerizable polyacrylic urethane monomers and resins can be prepared from hydroxyalkyl acrylates, polyisocyanates, and polyols. Copolymerizable monoacrylic-urethane monomers of this type are disclosed in U S. Pat. No. 4,078,015.

Harrison, U.S. Pat. No. 4,065,627, discloses a method for preparing acrylic-functional resins from hydroxyalkyl dicarboxylic acid ester, acrylamide, and formaldehyde. Disadvantages in the preparation of these derivatives are again the need for water-immiscible solvents and the high temperatures required for reaction. In addition, the N-methylolamide linkage in these materials

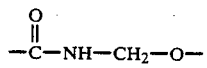

is expected to be quite sensitive to acid catalyzed hydrolysis.

A further method for preparing acrylic-functional resin systems is taught in U.S. Pat. No. 4,100,047 and involves reaction of a hydroxy-functional acrylate, or a polyether or polyester thereof, with a tetracarboxylic dianhydride.

U.S. Pat. No. 4,134,916, discloses acryloyl derivatives of polyalkoxyalkylamines prepared by the reaction of a polyalkoxyalkylamine with acrylic acid, acrylic ester, or acryloyl chloride at a temperature of from about 150° C. to about 300 ° C.

Although it is apparent from the above prior art that it is known to prepare acrylic-functional resin compositions, no method is known for preparing acrylic-functional resins by a simple ring-opening reaction. The acrylamido- and methacrylamido-acylated oligomers of the present invention are novel and they are prepared more easily by Applicant's novel method than related oligomers can be prepared by methods known in the art.

SUMMARY OF THE INVENTION

This invention provides acrylamido- and methacrylamido-acyl oligomers which are the acrylamido-acyl and methacrylamido-acyl derivatives of amino-, hydroxyl- and thiol-substituted polyoxyalkylene, polyalkyleneimine, polyester, polyolefin, polyacrylate ester, polyamide, polymerized fatty acids, and polysiloxane oligomers having at least one hydroxyl, thiol, or primary or secondary amino group and a molecular weight of about 200 to about 20,000. Preferably, the acrylamido-acyl and methacrylamido-acyl oligomers have the general formula:

$$A_p(HX)_{n-p}R \qquad \text{I}$$

wherein
R is an organic group having a valence of n and is the residue of a nucleophilic group-substituted oligomer, $(HX)_nR$, in which n and X are as defined below, the oligomer being selected from polyoxyalkylene, polyester, polyolefin, polyacrylate (polyacrylic acid ester), and polysiloxane oligomers having one or more hydroxyl, amino, or thiol groups and having a molecular weight of about 200 to about 20,000;

n is a positive number of at least one and represents the valence of R;

p is a positive number between 1 and n inclusive and represents the number of HX groups that have been reacted with alkenyl azlactones;

A is an acrylamido-acyl group or a methacrylamido-acyl group having the formula

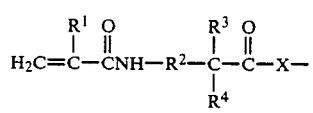

wherein
$R^1$ is hydrogen, chlorine, or a methyl group;
$R^2$ is a single bond or a methylene or ethylene group, the last two of which can be substituted by an alkyl group having 1 to 6 carbon atoms or a phenyl group;
$R^3$ and $R^4$ are independently hydrogen, an alkyl or cycloalkyl group having 1 to 12 carbon atoms, an aryl or aralkyl group having 6 to 12 carbon atoms, or $R^3$ and $R^4$ taken together with the carbon atom to which they are attached form a 5- to 12-membered carbocyclic ring; and
X is

=O—, or —S—, in which $R^5$ is (a) hydrogen or (b) a hydrocarbyl group selected from (1) an alkyl or cycloalkyl group having 1 to 12 carbon atoms optionally substituted by a cyano, hydroxyl, or alkoxy group having 1 to 4 carbon atoms, or A, or (2) an aryl or aralkyl group having 6 to 12 carbon atoms, wherein A is as defined above;
with the proviso that when $R^5$ is a hydrocarbyl group, then at least one of $R^3$ and $R^4$ is hydrogen.

The present invention provides a process for the production of acrylamido- and methacrylamido-acylated oligomers of formula I by the ring opening reaction of 2-alkenyl-1,3-oxazolin-5-ones, 2-alkenyl-5,6-dihydro-4H-1,3-oxazin-6-ones, and 2-alkenyl-4,5,6,7-tetra-hydro-1,3-oxazepin-7-ones (referred to collectively hereinafter as "alkenyl azlactones" for brevity), having the formula:

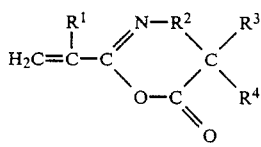

II wherein $R^1$, $R^2$, $R^3$, and $R^4$ are the same as defined for formula I with a nucleophilic group-substituted oligomer having the formula:

$(HX)_nR$    III wherein R, X and n are the same as defined above for formula I.

DETAILED DESCRIPTION OF THE INVENTION

The azlactones of formula II, above, useful for the preparation of the acrylamido-acyl oligomers of the invention are cyclic anhydrides of acylated amino acids prepared as shown in the following flow chart.

particularly with regard to the 5-membered rings, the 2-alkenyl-1,3-oxazolin-5-ones.

Typically, the amino acid is reacted with the acylating agent (e.g., (meth)acryloylchloride or (meth)acrylic anhydride) in the presence of a base (e.g., aqueous sodium hydroxide) to produce the acylated amino acid. Cyclization to the azlactone is then accomplished in the presence of a dehydrating agent (e.g., acetic anhydride, ethyl chloroformate, or dicyclohexylcarbodiimide). In analogous fashion, the higher membered analogues may be prepared and used for preparation of the oligomers of the present invention. Due to the greater stability of the 5-membered ring azlactones, these compounds are preferred. Most preferred are those in which both $R^3$ and $R^4$ independently represent hydrocarbon radicals of from 1 to about 12 carbon atoms.

Examples of suitable alkenyl azlactones, formula II, include the 5-membered ring azlactones:
2-ethenyl-1,3-oxazolin-5-one,
2-ethenyl-4-methyl-1,3-oxazolin-5-one,
2-isopropenyl-1,3-oxazolin-5-one,
2-isopropenyl-4-methyl-1,3-oxazolin-5-one,
2-ethenyl-4,4-dimethyl-1,3-oxazolin-5-one,
2-isopropenyl-4,4-dimethyl-1,3-oxazolin-5-one,
2-ethenyl-4-methyl-4-ethyl-1,3-oxazolin-5-one,
2-isopropenyl-4-methyl-4-butyl-1,3-oxazolin-5-one,
2-ethenyl-4,4-dibutyl-1,3-oxazolin-5-one,
2-isopropenyl-4-methyl-4-dodecyl-1,3-oxazolin-5-one,
2-isopropenyl-4,4-diphenyl-1,3-oxazolin-5-one,
2-isopropenyl-4,4-pentamethylene-1,3-oxazolin-5-one
 (also named: 2-isopropenyl-3-oxa-1-aza[4,5]spirodec-1-ene-4-one),
2-isopropenyl-4,4-tetramethylene-1,3-oxazolin-5-one
 (also named: 2-isopropenyl-3-oxa-1-aza[4,4]spironon-

Flow Chart

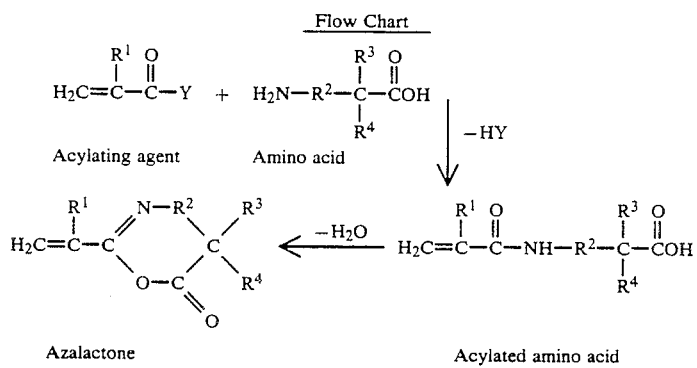

Acylating agent    Amino acid           Azalactone                              Acylated amino acid wherein $R^1$, $R^2$, $R^3$, and $R^4$ are the same as defined for formula I, and Y is halogen, hydroxyl, an alkoxyl group or

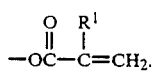

The synthesis of the azlactones has been fully discussed in the literature by:
 (a) Y. Iwakura, F. Toda, and Y. Torii, *Tetrahedron*, 23, 3363 (1967);
 (b) K. Hubner, F. Kollinsky, G. Mardert, and H. Pennewiss, *Angew. Makromol. Chem.*, 11, 109 (1970);
 (c) L. D. Taylor and T. E. Platt, *J. Polym. Sci., Polym Letters Edit.*, 7, 597 (1969);

1-ene-4-one), and
2-ethenyl-4,4-undecamethylene-1,3-oxazolin-5-one
 (also named: 2-ethenyl-3-oxa-1-aza[4,11]spirohexadec-1-ene-5-one),
the 6-membered ring azlactones:
2-ethenyl-5,6-dihydro-4H-1,3-oxazin-6-one,
2-isopropenyl-5,6-dihydro-4H-1,3-oxazin-6-one,
2-isopropenyl-5,6-dihydro-5,5-dimethyl-4H-1,3-oxazin-6-one,
2-isopropenyl-5,6-dihydro-5,5-dibutyl-4H-1,3-oxazin-6-one,
2-isopropenyl-5,6-dihydro-5,5-di(2-methylphenyl)-4H-1,3-oxazin-6-one, and
2-ethenyl-5,6-dihydro-5,5-pentamethylene-4H-1,3-oxazin-6one (also named: 2-ethenyl-3-oxa-1-aza[5,5]-spiroundec-1-ene-4-one);
and the 7-membered ring azlactones:
2-ethenyl-4,5,6,7-tetrahydro-1,3-oxazepin-7-one, 2-isopropenyl-4,5,6,7-tetrahydro-1,3-oxazepin-7-one, and 2-isopropenyl-4,5,6,7-tetrahydro-6,6-dimethyl-1,3-oxazepin-7-one.

Suitable nucleophilic group-substituted oligomers, compounds of formula III, which can be reacted with the alkenyl azlactones, compounds of formula II, to produce the acryl- and methacrylamido-acylated oligomers of the invention can vary widely within the scope of the invention. In general, the nucleophilic group-substituted oligomers possess one or more functional groups capable of reacting with azlactone of formula II. Particular examples of useful materials include: (1) polyether polyols, such as polyethyleneglycol, polypropyleneglycol and polytetramethyleneglycol and the like; (2) polyester polyols, such as polycaprolactone polyols, polyneopentyladipate polyols and the like; (3) polyoxyalkylene polyamines, such as the polyethylene- and polypropyleneoxide based mono- and polyamines available from Jefferson Chemical Co., Inc., a subsidiary of Texaco, Inc., under the trade name Jeffamine ®; 4) hydroxy- and amino-functional derivatives of polymerized fatty acids, more commonly referred to as "dimer" or "trimer" acid derivatives, such as those sold commercially under the trade designation Kemamine ® (Humko Sheffield Chemical); (5) hydroxy- or amino-functional olefin polymers and copolymers, such as hydroxy-terminated polybutadienes, amine-terminated butadiene, acrylonitrile copolymers (B. F. Goodrich's HYCAR ® ATBN); (6) primary or secondary amino-functional polyamides, such as those useful as epoxy curing agents (e.g. Emerez ® reactive polyamide resins from Emery Industries, Inc.); (7) polyethyleneimines; (8) polyvinyl alcohol and other hydrolyzed or partially hydrolyzed vinyl acetate homo- and inter-polymers; (9) polysiloxane polyols such as those described in U.S. Pat. No(s). 4,098,742; 3,886,865; 3,577,264; and 4,013,698. A particular class of materials useful for preparation of the oligomers of the present invention is a series of polyamides of polyethers of the general structure:

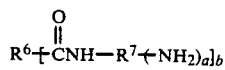

wherein $R^6$ is the residue of a mono- or polyfunctional carboxylic acid having at least one active hydrogen removed therefrom, $R^7$ is a polyether radical corresponding to a polyether polyamine having a molecular weight of from about 200 to about 20,000, and a and b are independently integers from 1 to about 4. These polyamines are conveniently prepared by standard condensation techniques from the appropriate organic acid (or suitable derivative) and excess polyether polyamine such as those described in U.S. Pat. No(s). 4,107,061 and 3,257,342, incorporated herein by reference.

Other examples of useful nucleophilic group-substituted oligomers include polyacrylates by which is meant polyacrylic acid esters such as polymers and copolymers of hydroxy functional acrylates and methacrylates, including 2-hydroxyethyl acrylate, 2-hydroxyethyl methacrylate, 3-hydroxypropyl acrylate, 3-hydroxybutyl acrylate, N-(2-hydroxyethyl)acrylamide, polyoxyethylene glycol monoacrylate, polyoxypropylene glycol monomethacrylate, and the like; useful comonomers include the vinyl aromatic monomers such as styrene, α-methylstyrene, 2- and 4-vinyl-pyridine, and the like; α,β-unsaturated carboxylic acids such as acrylic acid, methacrylic acid, itaconic acid, maleic acid, fumaric acid, crotonic acid, and the like; α,β-unsaturated carboxylic acid derivatives such as methyl methacrylate, butyl methacrylate, 2-ethylhexyl methacrylate, ethyl acrylate, butyl acrylate, iso-octyl acrylate, octadecyl acrylate, cyclohexyl acrylate, tetrahydrofurfuryl methacrylate, phenyl acrylate, phenethyl acrylate, benzyl methacrylate, β-cyanoethyl acrylate, diethyl itaconate, acrylamide, methacrylonitrile, N-butylacrylamide and the like; vinyl aliphatic monomers such as vinyl ethers of carboxylic acids such as vinyl acetate, vinyl 2-ethylhexanoate and the like; vinyl halides such as vinyl chloride, vinylidene chloride and the like; vinyl alkyl ethers such as methyl vinyl ether, 2-ethylhexyl vinyl ether, butyl vinyl ether and the like; olefins such as ethylene; N-vinyl compounds such as N-vinylpyrrolidone, N-vinylcarbazole and the like; vinyl ketones such as methyl vinyl ketone and the like; and vinyl aldehydes such as acrolein, methacrolein and the like.

Polyacrylates useful in the present invention can be prepared by methods disclosed, for example, in U.S. Pat. No(s). 4,276,432 and 4,137,389.

The process for preparing the novel acrylamido- and methacrylamido-acylated oligomers of the present invention involves admixing the 2-alkenylazlactone of formula II with the nucleophilic group substituted oligomer (about 0.8 to about 1.2 equivalent weights of nucleophilic oligomer per mole of azlactone) while providing appropriate mixing, at a temperature of about 0° C. to 50° C. and under atmospheric pressure, and optionally in the presence of a nonreactive organic solvent or water as a diluent. For the most part, however, the use of a solvent is unnecessary and the compositions can thus be prepared in 100% solids form. The two reactants can be charged into the reaction vessel in any order. When the nucleophilic oligomer, formula III, is amine-functional, the ensuing ring-opening reaction is relatively rapid and is generally accompanied by a mild exotherm, which may be mediated if desired by use of an appropriate cooling bath. Reactions with polyols, however, were found to be quite sluggish and required a catalyst for efficient conversion. While the literature teaches the use of Bronsted acid catalysts such p-toluenesulfonic acid and phosphoric acid with lower molecular weight alcohols, we have found these to be quite ineffective for promoting reactions with the higher molecular weight alcohols and polyols useful for the purposes of this invention. We have now found that certain Lewis acids are effective catalysts for promoting this reaction. Useful Lewis acids include $BF_3$, $BF_3$-etherate, $AlCl_3$, $FeCl_3$, $SnCl_4$, and $ZrCl_4$. Other useful catalysts are, for example, the strong bases, such as tetrabutylammonium hydroxide, alkali metal hydroxides and alkoxides. With mercaptan functional oligomers, basic catalysts, e.g., triethylamine, must be used. From about 0.1 to 5 percent by weight of catalyst based on azlactone is used for promoting the reaction; however, when the nucleophilic oligomer is amine functional, the use of catalyst is unnecessary. The ring-opening reactions leading to the present oligomers are in general conveniently monitored by infrared spectroscopy, completion of the reaction being indicated by disappearance of the azlactone carbonyl absorption peak at about 5.4 micrometers.

As should be obvious to one skilled in the art, the acrylamide functionality, with its inherent ability to form hydrogen bonds, will exert a marked effect upon the final viscosity of the compositions of this invention.

As a general trend, as the equivalent weight of the nucleophilic group substituted oligomer goes down, the viscosity of the resultant acrylamido- and methacrylamido-acylated oligomers increases. For example, when polyoxypropylene diamines (Jeffamine® D-series) are used, Jeffamine® D-400 (molecular weight ≃400) produces an extremely viscous resin which flows slowly, whereas Jeffamine® D-2000 (molecular weight ≃2000) produces a fluid of about 100 poises viscosity at 21° C. This dramatic difference in viscosities is not nearly so evident when polyols are reacted with the alkenyl azlactones to produce the oligomers of this invention, and only moderate increases in viscosity are observed over the viscosities of the starting polyols. This difference is probably attributable to the difference in the acrylamidoacetamido versus the acrylamidoacetoxy end groups of these resins having formula IV and formula V, respectively.

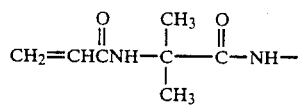  FORMULA IV

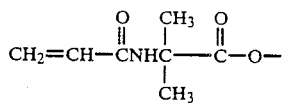  FORMULA V

The oligomers of the present invention find utility in a wide variety of applications because they are free-radically curable. They are useful as components of various adhesive systems, such as may be used as monomers or crosslinkers in pressure sensitive adhesive formulations and tapes. In addition to their uses in adhesives, the present oligomers also find utility, for example, in the preparation of curable binders, coatings, films, resists, printing inks, and saturants when formulated according to procedures well known in the art with appropriate free radical generators, pigments, fillers, and/or other additives common to the art.

The term "free radical generator" is used herein to include both thermally and photochemically activatable free radical initiators and sensitizers. Suitable free radical initiators which may be added to the present compositions to produce thermally curable coating compositions include azo compounds such as azobis(isobutyronitrile), hydroperoxides such as tert-butylhydroperoxide, peroxides such as benzoyl peroxide or cyclohexanone peroxide, and also include redox catalysts such as the persulfate/bisulfate pair, peroxide/tertiary amine combinations, or other redox couples capable of initiating free radical polymerizations. Generally, from about 0.01 to 5 percent by weight of thermally activated initiator is used.

Thus, while it is within the scope of this invention to prepare thermally curable compositions as described above, an additional aspect, which in many instances becomes a preferred embodiment, of the invention is found in the preparation of solventless resin compositions curable by activating radiation.

The term "free-radically curable" is used herein simply to indicate that the compositions of the invention may be polymerized by the action of free radicals wherein said polymerization may or may not result in a cross-linking reaction. The term "activating radiation" is used herein to denote radiation which can be either electromagnetic, e.g. visible or ultraviolet, or ionizing, e.g. high energy electrons, in origin. An excellent discussion of these different forms of activating radiation can be found in W. J. Moore's text entitled *Physical Chemistry* (3rd edition, Prentice Hall, 1964, p. 819).

When the source of activating radiation is electromagnetic, a sensitizer or photoinitiator is preferably added to the composition. Any of the common sensitizers or photoinitiators may be utilized, such as benzophenone, benzophenone/amine combinations, benzoin, benzoin ethers and their derivatives. Additional listings of sensitizers and photoinitiators which are useful in the invention may be found in J. F. Rabek, *Photochemistry and Photobiology*, 7, 5 (1968) and in G. Oster and N. Yang, *Chem. Rev.*, 68, 125 (1968). These sensitizers are generally incorporated at about 0.001 to about 5.0 percent by weight, although higher levels may be utilized.

Whereas the oligomers of the present invention are useful in and of themselves, it is also within the scope of the invention to blend these acrylamidoacylated oligomers with reactive cosolvents in order to produce new resin compositions. By "reactive cosolvents" is meant any monomer containing free-radically polymerizable ethylenic unsaturation, and which will thus be incorporated during curing of the present compositions. Examples of such reactive cosolvents include vinyl aromatics such as styrene, vinyl toluene, and vinyl pyridines and the like; methyl and other alkyl acrylates and methacrylates and the like; vinyl esters such as vinyl acetate and the like; vinyl amides such as N-vinyl pyrrolidinone and the like; vinyl esters of α,β-unsaturated carboxylic acids such as acrylic acid, methacrylic acid, crotonic acid, itaconic acid, maleic acid and fumaric acid or their derivatives, such as maleic anhydride and the like. Similarly, components containing more than one polymerizable moiety may be included such as divinyl benzene, multiacrylates and methacrylates such as ethyleneglycol diacrylate, trimethylolpropane triacrylate, pentaerythritol tri- and tetraacrylate, the Michael addition product of diethanolamine and trimethylolpropane triacrylate, and the like. As previously discussed, these new compositions containing the reactive diluents may also contain incorporated therein the various additives common to the art.

Objects and advantages of this invention are further illustrated by the following examples, but the particular materials and amounts thereof recited in these examples, as well as other conditions and details, should not be construed to unduly limit this invention.

EXAMPLE 1

A round-bottomed flask equipped with a mechanical stirrer and a dropping funnel was charged with 250 g Jeffamine® D-2000 (0.24 equivalents of polyoxypropylenediamine, having an equivalent weight of 1041.7), and cooled in a cold water (10–15° C.) bath. The contents of the flask were rapidly stirred and 33.4 g 2-ethenyl-4,4-dimethyl-1,3-oxazolin-5-one (0.24 mol) was added in a stream. Stirring was continued 15 minutes, then the cold water bath was removed. After stirring an additional 2 hours at room temperature, analysis of the cated reaction mixture by infrared spectroscopy indicated complete disappearance of the azlactone carbonyl absorption and the 2-acrylamido-2,2-dimethylacylated oligomer had been formed. The resin had a Brookfield viscosity (21° C.) of 96 poises.

EXAMPLES 2–16

Using a procedure similar to that of Example 1, a number of other acrylamidoacylated oligomers were prepared from amino-functional resins and azlactones as shown in TABLE I. Infrared spectral analysis was used in all cases to verify complete conversion to product.

TABLE I

| Example | Azlactone* | Aminofunctional Resin | Brookfield viscosity (poises, 20° C.) |
|---|---|---|---|
| 2 | A | Jeffamine$^R$ ED-600$^a$ | 17 |
| 3 | A | Jeffamine$^R$ ED-900$^b$ | 37 |
| 4 | A | Jeffamine$^R$ M-300$^c$ | 16 |
| 5 | A | Jeffamine$^R$ M-360$^d$ | 10 |
| 6 | A | Jeffamine$^R$ M-600$^e$ | 36 |
| 7 | A | Jeffamine$^R$ DU-3000$^f$ | 85 |
| 8 | A | Jeffamine$^R$ D-400$^g$ | 221,000 |
| 9 | A | Jeffamine$^R$ T-403$^h$ | 260,000 |
| 10 | A | Jeffamine$^R$ DU-1700$^i$ | 9,000 |
| 11 | A | ABAN - 810$^j$ | 62$^k$ |
| 12 | B | Jeffamine$^R$ D-2000 | 37.5 |
| 13 | C | Jeffamine$^R$ D-2000 | 320 |
| 14 | D | Jeffamine$^R$ D-2000 | 62.3 |
| 15 | E | Jeffamine$^R$ DU-3000 | 192 |
| 16 | F | Jeffamine$^R$ D-2000 | 76 |

*A 2-Ethenyl-4,4-dimethyl-1,3-oxazolin-5-one
*B 2-Propenyl-4,4-dimethyl-1,3-oxazolin-5-one
*C 2-Propenyl-4,4-tetramethylene-1,3-oxazolin-5-one
*D 2-Ethenyl-4-methyl-4-n-nonyl-1,3-oxazolin-5-one
*E 2-Ethenyl-4-methyl-4-phenyl-1,3-oxazolin-5-one
*F 2-Ethenyl-1,3-oxazolin-5-one
$^a$Polyoxyethylene diamine, amine equivalent weight 327
$^b$Polyoxyethylene diamine, amine equivalent weight 508
$^c$Polyoxypropylene monoamine, approximate molecular formula $CH_3(CH_2)_{7-9}C-H_2OCH_2CH(CH_3)OCH_2CH(CH_3)NH_2$, amine equivalent weight 288
$^d$Polyoxyethylene monoamine, approximate molecular formula $n-C_4H_9(OCH_2CH_2)_4(OCH_2CH(CH_3))_2NH_2$, amine equivalent weight 374
$^e$Polyoxypropylene monoamine, approximate molecular formula $CH_3OCH_2CH_2O(CH_2CH(CH_3)O)_8CH_2CH(CH_3)NH_2$, amine equivalent weight 568
$^f$Polyoxypropyleneurea diamine presumably prepared according to Waddill, et al, U.S. Pat. No. 4,002,598, amine equivalent weight 2130
$^g$Polyoxypropylene diamine, amine equivalent weight 206
$^h$Polyoxypropylene triamine, amine equivalent weight 152
$^i$Polyoxypropyleneurea diamine, amine equivalent weight 1167
$^j$Aminofunctional butadiene/acrylonitrile copolymer, United Technologies, amine equivalent weight 1613
$^k$50% solids in toluene.

EXAMPLE 17

A monoacrylamidoacylated polyether oligomer was prepared from Jeffamine ® M-1000 (approximate molecular formula $CH_3O(CH_2CH_2O)_{18.6}(CH_2CH(CH_3)O)_{1.8}CH_2CH(CH_3)NH_2$, amine equivalent weight 1205) and azlactone A (see Example 2) by a procedure similar to that of Example 1, except that a warm (40° C.) water bath was used to keep the reaction mixture in the liquid state. The product was a waxy solid.

EXAMPLE 18

Jeffamine ® D-230 (polyoxypropylene diamine, equivalent weight 120), 11.15 g (0.092 equiv.), was dissolved in 24 g distilled water and the mixture cooled to 15° C. in an icebath. Azlactone A (see Example 2) (12.92 g, 0.093 equiv.) was added with stirring. A rapid exotherm to 42° C. occurred, then the reaction mixture slowly returned to 15° C. over the next 15 minutes. The icebath was removed and the mixture was allowed to stir an additional 1.5 hours. A portion of the mixture was poured into a petri dish and dried at room temperature under vacuum (approximately 1 torr) overnight to give the bis-acrylamidoacylated product, identified by spectral analysis, as a colorless, glassy solid.

EXAMPLE 19–21

The following bis-acrylamidoacylated oligomers, identified by spectral analysis, were prepared by a procedure similar to that of Example 18 except that a cold water bath and different solvents were employed:
Example 19 —From Jeffamine ® ED-2001 (polyoxyethylenediamine, equivalent weight 1156) and azlactone A at 40% solids in ethyl acetate. Removal of solvent produced a colorless, waxy solid.
Example 20 —From Kemamine ® DP-3680 ($C_{36}$- dimer diprimary amine, Humko-Sheffield Chemical, amine equivalent weight 312) and azlactone A at 45% solids in toluene.
Example 21—From polytetramethyleneoxide diamine (amine equivalent weight 5465) and azlactone A at 50% solids in diethyl ether. Removal of solvent produced a tough, somewhat rubbery solid.

EXAMPLE 22

Crude N-acryloyl-β-alanine (14.3 g, 0.1 mol) was suspended in 200 ml methylene chloride and the mixture cooled in an ice-water bath. To the stirred mixture was added a solution of dicyclohexylcarbodiimide (19.57 g, 0.095 mol) in 60 ml methylene chloride. The reaction mixture was then stirred for 18 hours, filtered, and the solvent removed in vacuo to give 13 g crude 2-ethenyl-4,5-dihydro-4H-1,3-oxazin-6-one as a yellow oil, identified by spectral analysis.

EXAMPLE 23

Equivalent amounts of crude 2-ethenyl-4,5-dihydro-4H-1,3-oxazin-6-one from Example 22 and Jeffamine ® D-2000 were allowed to react under conditions similar to those of Example 1 to produce an acrylamidoacylated oligomer displaying Brookfield viscosity (21° C.)=42 poises.

EXAMPLE 24

Equivalent amounts of crude 2-ethenyl-4,5-dihydro-4H-1,3-oxazin-6-one and Jeffamine ® CD-400 (N,N'-bis cyanoethylated version of Jeffamine ® D-400, equivalent weight 253) were allowed to react as in Example 1 for 15 days to give the bisacrylamidoacylated oligomer having a Brookfield viscosity (21° C.)=1,960 poises.

EXAMPLE 25

3-Acrylamido-3-methylbutyric acid (52.3 g, 0.31 mol), prepared according to D. I. Hoke and R. D. Robins, J. Polym. Sci., 10, 3311 (1973), was added portionwise over 30 minutes to a stirred solution of dicyclohexylcarbodiimide (63 g, 0.31 mol) in dichloromethane (300 ml), maintaining the temperature below 25° C. Stirring was continued for an additional 45 minutes, then the reaction mixture was filtered, the solvent removed, and the residue distilled to give 38.2 g (82%) of 2-ethenyl-4,4-dimethyl-4,5-dihydro-4H-1,3-oxazin-6-one, identified by spectral and elemental analysis, as a colorless liquid, bp 81° C. (8 torr).

EXAMPLE 26

Equivalent amounts of 2-ethenyl-4,4-dimethyl-4,5-dihydro-4H-1,3-oxazin-6-one prepared as described in Example 25 and Jeffamine ® D-2000 were allowed to react as in Example 1 to give an acrylamidoacylated oligomer displaying Brookfield viscosity (21° C.) TM 49 poises.

EXAMPLE 27

Equivalent amounts of Carbowax ® 350 (Union Carbide polyethylene oxide monomethylether, equivalent weight 350) and azlactone A were allowed to react at room temperature in the presence of 0.23% by weight (based on amount of azlactone A) AlCl$_3$ as catalyst. After 43 hours, infrared analysis indicated essentially complete ring-opening had occurred to produce the expected acrylamidoacylated polyether oligomer, identified by spectral analysis; Brookfield viscosity (21° C.) TM 6 poises.

EXAMPLES 28–29

The following bisacylamides, identified by spectral analysis, were prepared from azlactone A by a procedure similar to that of Example 27 except that reaction was carried out at 50% solids in dichloromethane solvent:

Example 28 —From polycaprolactonediol (equivalent weight 637)

Example 29 —From bis(neopentylglycol) adipate.

EXAMPLE 30

Equivalent amounts of azlactone A and 4,7,10,13,16,19-hexaoxaeicosylamine (prepared from pentaethyleneglycol monomethyl-ether by cyanoethylation and reduction according to standard literature procedures) were allowed to react by a procedure similar to that of Example to give the acrylamidoacyloligomer, identified by spectral analysis, as a viscous fluid.

EXAMPLE 31

A diamino-diamide (equivalent weight 682), was prepared by the procedure of Sturwold and Williams, U.S. Pat. No. 4,107,061, from Hystrene ® 3695 (C$_{36}$-dimerized fatty acid from Humko-Sheffield, equivalent weight 290) and two equivalents of Jeffamine ® D-400. The oligomer was allowed to react with two equivalents of azlactone A at room temperature for 30 minutes to give the bisacrylamide, identified by spectral analysis, as a very viscous liquid.

EXAMPLE 32

In a manner similar to that of Example 31, a diaminodiamide (equivalent weight 463) prepared from adipic acid and Jeffamine ® D-400 was converted to the bisacrylamide, which was identified by spectral analysis

EXAMPLE 33

A mixture of the acrylamidoacylated Jeffamine ® D-2000 of Example 1 (100 parts) and Irgacure ® 651 (benzil dimethyl ketal, photoinitiator from Ciba-Geigy Corp., 0.5 parts) was coated on a silicone-coated release liner and cured with a blacklight irradiation for 1 minute in a nitrogen atmosphere to give a crosslinked, flexible, but fragile film.

EXAMPLE 34

A mixture of dimethylacrylamide (67 parts), acrylamidoacylated Jeffamine ® D-2000 (Example 1, 33 parts) and Irgacure ® 651(0.5 parts) was cured as in Example 33 to give a crosslinked, flexible, tough film.

EXAMPLE 35

A mixture of the acrylamidoacylated oligomer of Example 31 (100 parts) and Irgacure ® 651 (0.5 parts) were cured as in Example 33 to give a crosslinked, somewhat pressure sensitive film.

The following example illustrates utilization of a composition of the instant invention as a component of a protective topcoat for reflective sheeting.

EXAMPLE 36

A photocurable clear topcoat was formulated using the following materials:

| | |
|---|---|
| n-butyl acrylate | 6.0 grams |
| ethyl acrylate | 3.0 grams |
| pentaerythritol tetraacrylate | 1.0 gram |
| Jeffamine ® D-2000 adduct of Example 1 | 2.5 grams |
| Diethoxyacetophenone | 0.6 gram |

The mixture was applied to Scotchlite ® Reflective Sheeting (3M) using a 0.0015 Bird Film Applicator ® (Gardner Laboratory, Inc., Bethesada, Md.) providing an ultimate cured film thickness of 0.75 mils. The coated sheeting was exposed to ultraviolet light provided by PPG's Model QC 1202NA ® processing unit (PPG Industries, Inc.) in the full lamp setting position at 80fpm in air. A tack-free cure was obtained in one pass, but two additional passes were used to insure cure. The cured composite had excellent clarity, brightness, and gloss. Furthermore, these properties were retained satisfactorily even when samples were exposed to an Arizona environment for two years.

EXAMPLE 37

Using a procedure similar to that of Example 27, a polyacrylate polyol (for example, the styrene/butyl acrylate/methacrylic acid/hydroxypropyl acrylate copolymer [37/40/21/2 parts by weight] as disclosed in Example 12 of U.S. Pat. No. 4,276,432, and having a number average molecular weight of 1000), can be reacted with azlactone A to produce the corresponding acrylamidoacylated oligomer.

Various modifications and alterations of this invention will become apparent to those skilled in the art without departing from the scope and spirit of this invention, and it should be understood that this invention is not to be unduly limited to the illustrative embodiment set forth herein.

What is claimed is:

1. A composition of matter comprising
   (a) an acrylamido- or methacrylamido-acyl oligomer having the general formula:

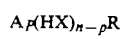

wherein
   R is an organic group having a valence of n and is the residue of a nucleophilic group-substituted oligomer, (HX)$_n$R, said oligomer being selected from the group consisting of polyoxyalkylene, polyalkyleneimine, organic polyester, polyacrylic acid ester, polysiloxane, and polyolefin oligomers having one or more hydroxyl, amino, or thiol groups and having a molecular weight of 200 to 20,000;
   n is a positive number of at least one and represents the valence of R;
   p is a positive number in the range of 1 to n;
   A is an acrylamido-acyl group or a methacrylamido-acyl group having the formula

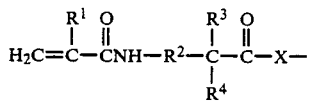

wherein

F[1] is hydrogen, chlorine, or a methyl group;

R[2] is a single bond or a methylene or ethylene group that can be substituted by an alkyl group having 1 to 6 atoms or phenyl;

R[3] and R[4] are independently hydrogen, an alkyl or cycloalkyl group having 1 to 12 carbon atoms, phenyl or alkyl-substituted phenyl having 6 to 12 carbon atoms, or R[3] and R[4] taken together with the carbon atom to which they are attached form a 5- to 12-membered carbocyclic ring; and X is

—O—, or —S—, in which R[5] is (a) hydrogen, (b) a group selected from an alkyl or cycloalkyl group having 1 to 12 carbon atoms optionally substituted by a cyano, hydroxyl, or an alkoxy group having 1 to 4 carbon atoms, or A;

with the proviso that when R[5] is an alkyl or cycloalkyl group, then at least one of R[3] and R[4] is hydrogen, and (b) an amount of a thermally or photochemically activatable free radical generator sufficient to initiate polymerization of said composition.

2. The composition according to claim 1 wherein R[2] of the oligomer formula is a single bond.

3. The composition according to claim 1 wherein both R[3] and R[4] of the oligomer formula independently represent an alkyl or cycloalkyl group of 1 to 12 carbon atoms.

4. The composition according to claim 1 further comprising at least one monomer containing free-radically polymerizable ethylenic unsaturation.

5. The composition according to claim 4 wherein said monomer is selected from the group consisting of vinyl aromatics, vinyl esters, vinyl amides, and alkyl acrylates and methacrylates.

6. The composition according to claim 1 further comprising a chemically effective amount of at least one of a sensitizer and photoinitiator.

7. The composition according to claim 4 further comprising a chemically effective amount of at least one of a sensitizer and photoinitiator.

8. The composition according to claim 1 cured in the presence of thermal or activating radiation to form a polymeric composition.

9. The composition according to claim 4 cured in the presence of thermal or activating radiation to form a polymeric composition.

10. The cured composition according to claim 1.

11. The cured composition according to claim 4.

* * * * *

UNITED STATES PATENT AND TRADEMARK OFFICE
CERTIFICATE OF CORRECTION

PATENT NO. : 4,996,243

DATED : February 26, 1991

INVENTOR(S) : Jerald K. Rasmussen et al.

It is certified that error appears in the above-identified patent and that said Letters Patent is hereby corrected as shown below:

In the Abstract, 8th line, kindly delete "radially" and insert therefor -- radically --.

Col. 2, line 64, "=O-" should read -- -O- --.

Col. 10, line 67, "TM" should read -- = --.

Col. 11, line 12, "TM" should read -- = --.

Col. 11, line 48, after the word "analysis", kindly insert -- . --.

Col. 13, line 12, between "6" and "atoms" kindly insert -- carbon --.

Signed and Sealed this

First Day of December, 1992

Attest:

DOUGLAS B. COMER

*Attesting Officer*    *Acting Commissioner of Patents and Trademarks*